United States Patent [19]
Higuchi

[11] Patent Number: 5,686,219
[45] Date of Patent: Nov. 11, 1997

[54] TONER EXTRUDER FEED PORT INSERT

[75] Inventor: Fumii Higuchi, Mississauga, Canada

[73] Assignee: Xerox Corporation, Stamford, Conn.

[21] Appl. No.: 624,153

[22] Filed: Mar. 29, 1996

[51] Int. Cl.⁶ .............................. G03G 5/00; B29C 47/76
[52] U.S. Cl. .................................... 430/137; 264/40.6
[58] Field of Search ........................... 430/137; 264/40.6

[56] References Cited

U.S. PATENT DOCUMENTS

| | | | |
|---|---|---|---|
| 3,778,287 | 12/1973 | Stansfield et al. | 106/308 Q |
| 4,784,595 | 11/1988 | Halter | 264/40.6 |
| 4,894,308 | 1/1990 | Mahabadi et al. | 430/137 |
| 4,973,439 | 11/1990 | Chang et al. | 264/101 |
| 5,145,762 | 9/1992 | Grushkin | 430/137 |
| 5,227,460 | 7/1993 | Mahabadi et al. | 528/272 |
| 5,376,494 | 12/1994 | Mahabadi et al. | 430/137 |
| 5,529,477 | 6/1996 | Takizawa et al. | 264/40.6 |

*Primary Examiner*—John Goodrow
*Attorney, Agent, or Firm*—John S. Wagley

[57] ABSTRACT

A toner extruder for the preparation of a toner resin extrudate from a resin is provided. The extruder includes a housing defining a housing aperture and a resin inlet opening in the housing. The extruder also includes a conveyor for conveying the resin through the housing aperture. The extruder further includes a member adjacent the resin inlet opening for inhibiting the heat transfer from the housing and/or the conveyor to the resin at the opening. The flow of resin adjacent the opening is thus improved.

20 Claims, 5 Drawing Sheets

TONER EXTRUDER FEED PORT INSERT

The present invention relates to a method and apparatus for manufacturing polyester based toners and low fix temperature resins. More particularly, the invention relates to an apparatus and method for extruding tones and resins through a die.

In the process of electrophotographic printing, a photoconductive surface has an electrostatic latent image recorded therein. Toner particles are attracted from carrier granules to the latent image to develop the latent image. Thereafter, the toner image is transferred from the photoconductive surface to a sheet and fused thereto.

Typically, toner may be produced by melt-mixing the soft polymer and pigment whereby the pigment is dispersed in the polymer. The polymer having the colorant dispersed therein is then pulverized. Recently in U.S. Pat. No. 5,227,460 (Mahabadi et al.), incorporated herein by reference, a low melt toner resin with minimum fix temperature and wide fusing latitude containing a linear portion and a cross-linked portion containing high density cross-linked microgel particles, but substantially no low density cross linked polymer was disclosed. A method of manufacturing that toner and its resin was disclosed in U.S. Pat. No. 5,376,494 (Mahabadi et al.), incorporated herein by reference. The method of fabricating the low fix temperature toner resins includes a reactive melt mixing process wherein polymer resins are cross-linked at high temperature and high shear. The resins are particularly suitable for high speed fusing, show excellent offset resistance and wide fusing latitude and superior vinyl offset properties.

The base resin and pigment are melt mixed together typically in an extruder which is a part of an extruding system. The soft polymer and pigment are translated and mixed in an auger within a cavity of the extruder.

The polyester base resins of the present invention are typically in the form of soft polymers. These base resins have an extremely low melting temperature. The melting temperature of these polyester based toners are about 90° C. A typical extruder is maintained at high temperature by jacket heaters on the extruder body. On top of this, as the base resin is extruded in an extruder, a significant amount of heat is generated which is result of high shear energy of the extruding. The heat from the extruding process raises the temperature of both the body of the extruder and the screw within the extruder. The entire extruder is at an elevated temperature above ambient. The polymer base resin is added to the extruder through a feed opening in the inlet end of the extruder.

When utilizing the low melt polymer based resins, the heat from the screws and body of the extruder tend to melt the base resin at the open feed barrel at which the resin is added to the extruder. The premature melting of the toner affects the productivity of the extruder. If the premature melting is severe enough, the extruder must be shut down and cleaned of the melted extruder before the process may continue.

Furthermore, the use of a commercially available extruder to manufacture the polyester base resins requires that the input area of feed barrel be redesigned to have a shape between the screws of the extruder and the body of the extruder which has increased clearance in order to optimize conveying base resin into the extruder. The requirement for increased clearance between the body and the screws when utilizing the polyester based resin, necessitates that the feed barrel of the extruder be changed from a standard feed barrel to a specially designed feed barrel when manufacturing such resin. This process is very time and labor intensive and results in a loss of productivity.

The following disclosures may be relevant to various aspects of the present invention:

U.S. Pat. No. 5,145,762
Patentee: Gruskin
Issue Date: Sep. 8, 1992

U.S. Pat. No. 4,973,439
Patentee: Chang et al.
Issue Date: Nov. 27, 1990

U.S. Pat. No. 4,894,308
Patentee: Mahabadi et al.
Issue Date: Jan. 16, 1990

U.S. Pat. No. 3,778,287
Patentee: Stansfield et al.
Issue Date: Dec. 11, 1973

U.S. Pat. No. 5,227,460
Patentee: Mahabadi et al.
Issue Date: Jul. 13, 1993

U.S. Pat. No. 5,376,494
Patentee: Mahabadi et al.
Issue Date: Dec. 27, 1994

U.S. patent application Ser. No. 08/247,821
Applicants: Proper et al.
Filing Date: May 23, 1994

The relevant portions of the foregoing disclosures may be briefly summarized as follows:

U.S. Pat. No. 5,145,762 (Grushkin) discloses a process for the preparation of toner compositions. The process comprises melt blending toner resin particles, magnetic particles, wax, and charge additives. The process further comprises adding a coupling component to the aforementioned mixture, injecting water therein, and cooling.

U.S. Pat. No. 4,973,439 (Chang et al.) discloses an apparatus for obtaining toner particles with improved dispersion of additive components therein comprised of a toner extrusion device containing therein a blending chamber, a mixing screw, a heater, a toner supply, and an injector for injecting additive components including charge control agents into the extrusion device enabling a decrease in the melting temperature of the toner resin particles contained therein.

In U.S. Pat. No. 4,894,308 (Mahabadi et al.), a process for preparing an electrophotographic toner is disclosed which comprises premixing and extruding a pigment, a charge control additive and a resin. The pigment and the charge control additive may be premixed prior to being added to the extruder with the resin; alternatively, the pigment and charge control additive may be premixed by adding them to the extruder via an upstream supply means and extruding them, and subsequently adding the resin to the extruder via a downstream supply means.

In U.S. Pat. No. 3,778,287 (Stansfield et al.) dispersions of inorganic pigments, lakes or toners in organic liquids containing polyesters dissolved therein having acid values up to 100 derived from certain hydroxy-containing, saturated or unsaturated aliphatic carboxylic acids are described. While liquid colorants offer the distinct advantage of being more readily incorporated into the medium to be colored than dry pigments, their commercial significance is seriously limited due to the problems of handling and storing potentially hazardous liquid chemicals. Thus, from an economic and safety standpoint, it is desirable to have the colorants in a dry, storage stable form which is readily dispersible in a wide variety of coating media without detriment to any of the desirable properties of coating produced therefrom.

U.S. Pat. No. 5,227,460 (Mahabadi et al.) discloses a low melt toner resin with minimum fix temperature and wide fusing latitude containing a linear portion and a cross-linked portion containing high density cross-linked microgel particles, but substantially no low density cross linked polymer.

U.S. Pat. No. 5,376,494 (Mahabadi et al.) discloses a method of fabricating low fix temperature toner resins by a reactive melt mixing process wherein polymer resins are cross-linked at high temperature and high shear. The resins are particularly suitable for high speed fusing, show excellent offset resistance and wide fusing latitude and superior vinyl offset properties.

U.S. Pat. No. 5,468,586 (Proper et al.) discloses an apparatus for the preparation of a mixture of toner resin and a liquid colorant. The apparatus includes a toner extruder having the resin being conveyed therethrough and a colorant feeder for adding the colorant to the toner resin in the toner extruder to form the toner mixture. The color of the extrudate is measured, compared to a standard and the amount of colorant added is modified accordingly.

U.S. patent application Ser. No. 08/501,528 now U.S. Pat. No. 5,650,484 (Hawkins et al.) discloses an apparatus for the preparation of a mixture of toner resin and initiator, to form a toner resin or toner mixture including cross-linked microgel particles is provided. The apparatus includes a toner extruder having the resin being conveyed therethrough and an adder for adding the initiator to the toner rosin in the toner extruder to form the toner resin or mixture. The apparatus also includes a measurer for measuring the cross-linked microgel particles in the toner mixture substantially immediately after mixing in the toner extruder and transmitting a signal indicative of the quantity of cross-linked microgel particles in the toner rosin or mixture. The apparatus also includes a controller for controlling the addition rate of initiator in response to the signals from the measurer.

In accordance with one aspect of the present invention, there is provided a toner extruder for the preparation of a toner resin extrudate from a resin. The extruder includes a housing defining a housing aperture and a resin inlet opening in the housing. The extruder also includes a conveyor for conveying the resin through the housing aperture. The extruder further includes a member adjacent the rosin inlet opening for inhibiting the heat transfer from the housing and/or the conveyor to the resin at the opening. The flow of rosin adjacent the opening is thus improved.

In accordance with another aspect of the present invention, there is provided a method for preparing a toner rosin. The method includes the steps of conveying the base resin to an aperture in the housing of a toner extruder, the housing surrounding a conveyor, inhibiting the heat transfer from the extruder to the base resin at the aperture, adding chemical initiator to a toner extruder, mixing the base rosin and the chemical initiator within the include an extruder 22 for mixing prepared resin mix with additives including very fine toner 26 and converting the prepared resin mix into a liquid form having a portion of the toner. Generally, any extruder, such as a single or twin screw extruder, suitable for preparing electrophotographic toners, may be employed for the melt mixing of prepared resin mix 26. For example, a Werner & Pfleiderer ZSK-58SC extruder is well-suited for melt-mixing the prepared resin mix 26.

The prepared resin mix is stored adjacent the extruder 22 in a dry resin feeder hopper 62. The extruder 22 typically includes a body 28 which defines a centrally located aperture 30 therethrough. A feed and mixing mechanism 36 is located in the aperture 30. Preferably the feed mechanism is in the form of a screw rotatably located in the aperture 30. The screw 36 rotates within aperture 30 about its axis. The extruder 22 for simplicity is described with a single screw, but many commercial extruders include twin screws, parallel to each other and closely spaced from each other. As the prepared resin mix is mixed, an extrudate 110 is formed which contains the additives evenly distributed within the raw resin. The screw 36 within the extruder 22 is preferably turned at the predetermined rate which allows the molten resin to achieve the desired melt-mixing and temperatures. The extrudate continues to pass through the extruder 22 to a die plate 120 located at an outlet 122 of the extruder 22. The die plate 120 includes a large rectangular aperture 124 through which the extrudate 110 exits the extruder 22. The aperture 124 is chosen of suitable size to provide flow sufficient to provide for a commercially acceptable process.

The extrudate 110 from the extruder 22 is cooled and squeezed to form a thin, preferably 1 to 2 mm, sheet by a pair of squeeze rolls 126 to form a thin sheet 111. This thin sheet 111 is further cooled by belt 127, extruder to form the mixed resin, and conveying the mixed resin within the extruder to an extruding die.

The invention will be described in detail herein with reference to the following Figures in which like reference numerals denote like elements and wherein.

According to the present invention, the toner created by the process of this invention comprises a resin and preferably a charge control additive and other known additives and, some times, very fines toners for reclaim purpose. The manufacture of black toners will be discussed henceforth. It should be readily apparent that the manufacture of colored toner may likewise include the process of the present invention.

Figure 2:
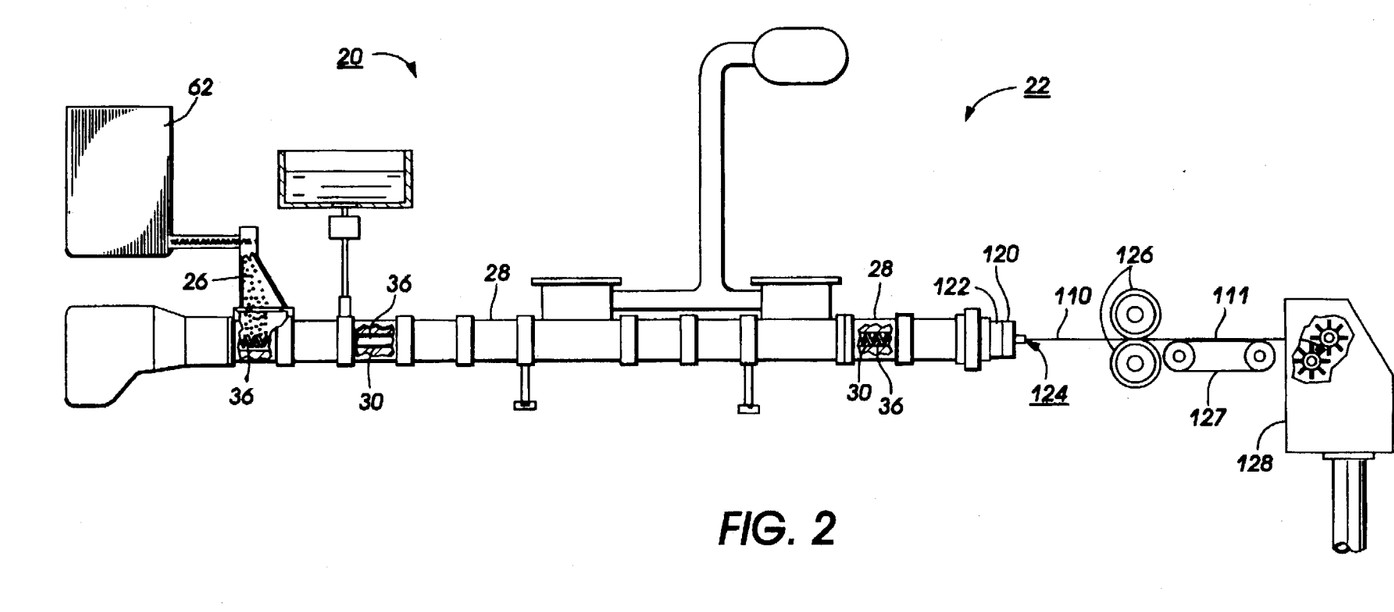
FIG. 2 is a schematic elevational view of the toner extruder according to the present invention.

In a process of this invention, a polyester resins with associated additives are fed to melt mixing apparatus and dispassion of additives and mixing of them are carried out at high temperature and high shear to produce a toner in extrudate form for next process, Referring first to FIG. 2, a toner preparing apparatus 20 in the form of an extruding system is shown. The toner preparing apparatus 20 preferably by double water cooled metal belts, prior to crushing the sheet 111 with a rotary pin breaker 128 or other suitable means.

After the resin has been cooled and crushed, they are reduced in size by any suitable method including those known in the art. An important property of toners is brittleness which causes the resin to fracture when impacted. This allows rapid particle size reduction in attritors, other media mills, or even jet mills used to make dry toner particles. It should be appreciated that the particle size reduction may possibly include the use of a pulverizer (not shown). The pulverizer may be a hammer mill such as, for example, an Alpine® Hammer Mill or FitzMill® rotary mill. The hammer reduces the toner particles to a size of about 300 microns to about 3 mm.

Figure 3:
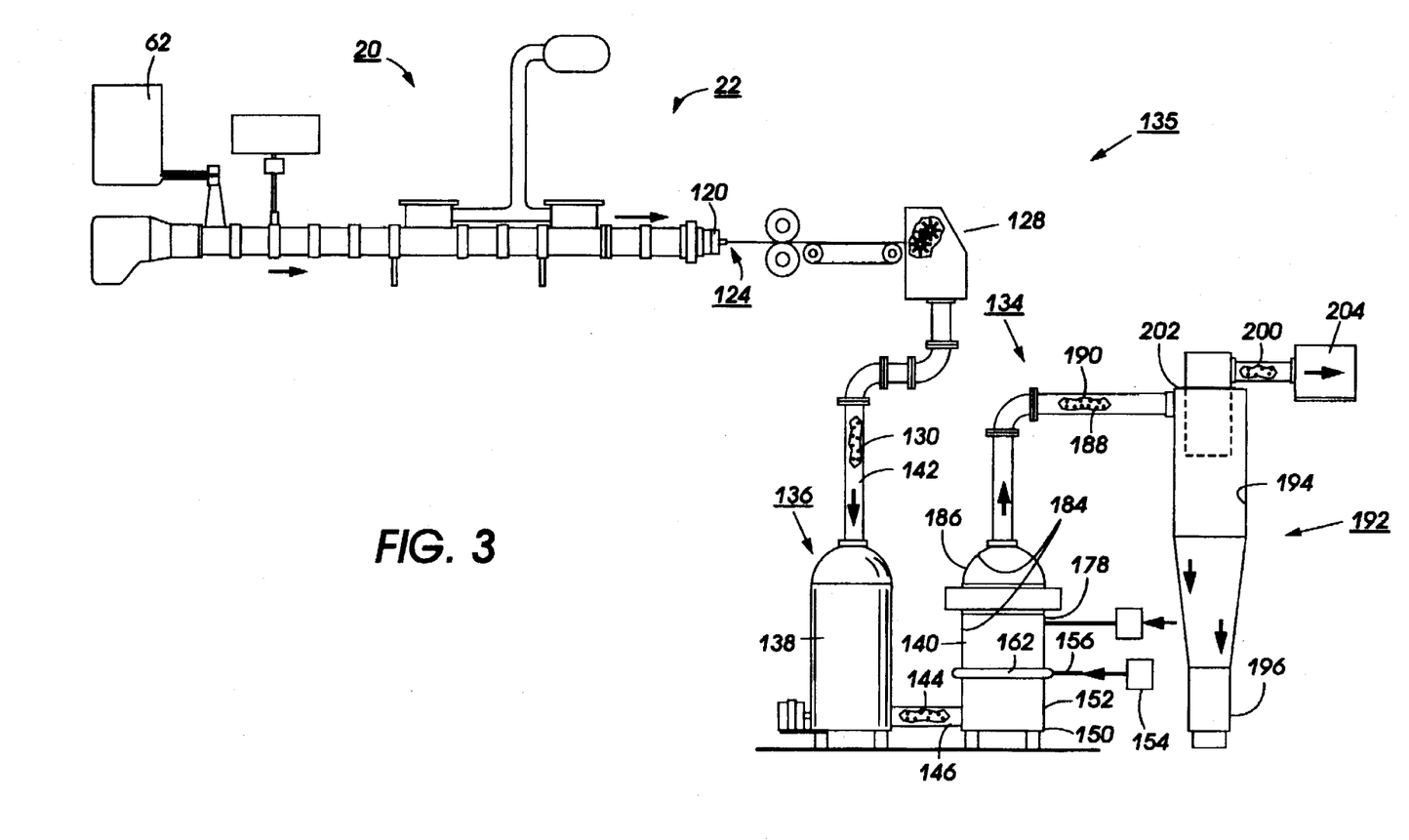
FIG. 3 is a schematic elevational view of a toner manufacturing system including a micronization system and the toner extruder of the present invention.

Referring now to FIG. 3, a micronization system 134 is shown in use with the toner preparing apparatus 20 to form a toner manufacturing system 135. The micronization system 134 serves to reduce the particle size of milled particles or material 130 into toner particles of an appropriate size, such as four to ten microns. The micronization system 134 is connected to the toner preparing apparatus 20 to form a toner manufacturing system 135.

As earlier stated, an important property of toners is brittleness, which causes the resin to fracture when impacted. This allows rapid particle size reduction in aerators, other media mills, or even jet mills to make dry toner particles.

The micronization system 134 includes a micronizer 136 which provides for the rapid particle size reduction of the particles 130 into toner particles. Preferably, the micronizer is a jet-type micronizer such as a jet mill. Jet mills containing a milling section into which water vapor jets or air jets are blown at high speeds and the solid matter to be micronized is brought in across an injector by a propellant. Compressed air or water vapor is usually used as the propellant in this process. The introduction of the solid matter into the injector usually occurs across a feeding hopper or entry chute.

For example, the micronizer 136 may be a Sturtvant 36 inch jet mill having a feed pressure of about 115 psig and a grinding air pressure of about 120 psig may be used in the preparation of the toner resin particles. The nozzles of this jet mill are arranged around the perimeter of a ring. Feed material is introduced by a pneumatic delivery device and transported to the injector nozzles. The particles collide with one another and are attrited. These particles stay in the grinding zone by centrifugal force until they are small enough to be carried and collected by a cyclone separator. A further size classification may be performed by an air classifier.

Preferably, however, the micronizer 136 is in the form of an AFG-800 grinder. The AFG-800 grinder is a fluidized air mill made by AFG (Alpine Fliebbertt-Gegenstrahlmuhle). The micronizer 136 includes a feed chamber 138 and a grind chamber 140. A pipe or tube 142 connects the rotary mill 128 with the feed chamber 138. The pipe 142 is made of any suitable durable material which is not interactive with the toner composition, such as stainless steel. The milled material 130 are propelled toward the feed chamber 138 by any suitable means such as by augers (not shown) or by blowers (not shown). The milled material 130 accumulated in the feed chamber 138 are extracted from the feed chamber 138 by a screw 144 located in a tube or pipe 146 interconnecting the feed chamber 138 with the grind chamber 140. The screw 144 and the pipe 146 are made of any suitable durable material which is not chemically interactive with the toner, such as stainless steel. The milled material 130 enter lower portion 150 of the grind chamber 140.

A pressurized fluid, preferably in the form of compressed air is added to the grind chamber 140 in a lower central portion 152 of the grind chamber 140. The compressed air is supplied by any suitable compressed air source 154, such as an air compressor. Compressed air conduit 156 interconnects the compressed air source with a ring 162 located around the grind chamber 140. Extending inwardly from the ring 162 are a series of inwardly pointing nozzles (not shown) through which the compressed air enters the grind chamber 140. The compressed air causes the particles 130 to accelerate rapidly inwardly within the grind chamber 140.

In an upper portion 178 of the grind chamber 140 a series of rotating classifier wheels (not shown) set the toner air mixture into rapid rotation. The classifier wheels (not shown) include fins (not shown) along the periphery of the classifier wheels. The wheels cause the larger particles, milled material 130, to be propelled to inner periphery 184 of the grind chamber 140 and to return to the lower portion 150 of the grind chamber 140. The milled material 130 impact each other and the components of the micronizer 136 and thereby micronize the toner into micronized toner 188. The micronized toner 188, on the other hand, is permitted to move upwardly within the grind chamber 140 into manifold 186.

A long connecting pipe 190 is connected on one end thereof to manifold 186 and on the other end thereof to a product cyclone 192. The long connecting pipe 190 serves to provide a conduit between the grind chamber 140 and the product cyclone 192 for the micronized toner 188. The long connecting pipe 190 may be of any suitable durable material, such as stainless steel.

The product cyclone 192 is designed to separate particles from the air stream in which they are carried. The product cyclone 192 may be any suitable commercially available cyclone manufactured for this purpose and may, for example, include a (quad) cyclone which consists of four cyclones combined. Within the product cyclone 192, the micronized toner 188 circulates in a spinning manner about inner periphery 194 of the cyclone 192. The larger micronized toner 188 has a greater mass and is thereby propelled to the inner periphery 194 of the cyclone 192, falling into lower portion 196 of the product cyclone 192. Air and very small dust particles 200 having a lesser mass and a particle size of, perhaps, less than 1 microns are drawn upwardly through upper opening 202 of the cyclone 192 into dust collector 204. The micronized toner 188 collects in the lower portion 196 of the cyclone 192 and is extracted therefrom.

Figure 1:
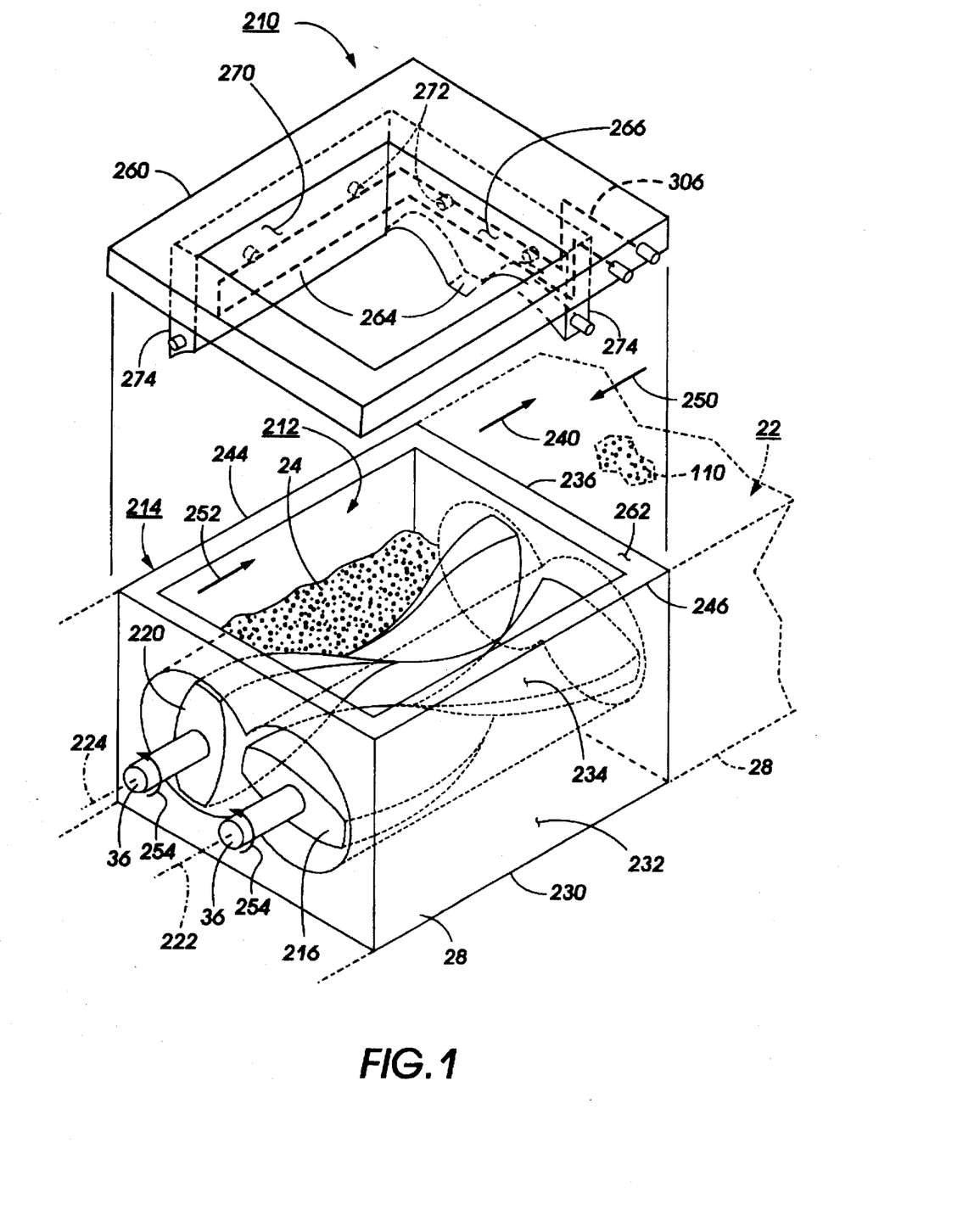
FIG. 1 is a perspective view of a toner extruder feed port with a toner extruder feed pod insert according to the present invention.

According to the present invention and referring to FIG. 1, a toner extruder feed port insert 210 is shown in position ready for assembly into toner extruder feed port 212. The toner extruder feed port 212 is in the form of a housing aperture within feed barrel 214 of extruder 22. The feed barrel 214 represents one section or portion of the body 28 of the extruder 22. While the invention may be practiced with extruders 22 having only a singular screw 36, preferably, the extruder 22 includes a twin screws 216 and 220. The first and second screws 216 and 220, respectively, are located proximate each other. Preferably, the first screw 216 has a first screw axis 222 which is parallel to second screw axis 224 of the second screw.

The feed barrel 214 includes a feed barrel body or housing 230 which defines the housing aperture or port 212. The feed barrel housing 230 includes a lower portion 232 which closely conforms with the screws 216 and 220 as well as an upper portion 234 which includes the central opening or port 212. The upper portion 234 of the feed barrel housing 230 may have any suitable shape, for example, as shown in FIG. 1, the upper portion 234 has a generally rectangular shape with four vertically extending walls which define the upper portion 234. These four walls include a downstream wall 236 located in the direction of flow 240 of the extrudate 110.

Opposed to the downstream wall 236 is an upstream wall 242. Located normal to the walls 236 and 242 are downwardly traveling screw wall 244 and upwardly traveling screw wall 246.

In prior art extruders, the entire feed barrel 214 would require removal when converting from conventional toner to polyester based resin toner. This is because the clearance between the screws 216 and 220 and the feed barrel 214 need to be altered or increased at initial meeting clearances when using the polyester based resin.

Heat from the extruding process propagates from the extrudate 110 to the body 28 of the extruder in a first direction 250 opposite a second direction 252 of flow of the extrudate 110. Since the heat propagates in the first direction 250, wall 236 of the feed barrel 214 receives the most heat. Furthermore, the intensive melt-mixing utilizes very high shear energy which results into heat. This heat is conducted throughout the screws 36 including the portion of screws 216 and 220 in the feed port 214. Applicants have found that it is at the downstream wall 236 and side wall 244 where the base resin 24 is most likely to melt and the most of scrapping of melted resin occur and cause damage to the extruder as well as to reduce its productivity and require downtime. Since the second screw 220 rotates in direction of arrow 254, the base resin 24 is urged between the screw 220 and the downwardly traveling screw wall 244. Between the downstream wall 236 and the two screws 216 and 220, the base resin 24 is also likely to melt.

Referring again to FIG. 1, toner extruder feed port insert 210 is shown. The insert 210 serves two main purposes. The first of these purposes is to isolate the heat from the extrusion process from the base resin 24. This isolation of the heat of the screws and the extruder from the base resin 24 serves to reduce the likelihood of the base resin melting and the associated problems therewith. The second of these benefits of the insert is that the insert serves to establish the greater clearance between the screws 216 and 220 and both walls 264 of the insert 210 that is required for the polyester base resin 24.

While the insert 210 may have any suitable shape, preferably the insert 210 includes a top ring or rim 260 which when assembled into the feed barrel 214 rests upon upper face 262 of the feed barrel 214. Extending downward from the top rim 260 are vertical walls 264 which separate the feed barrel housing 230 from the base resin 24. It should be appreciated that the invention may be practiced with as few as a single vertical wall 264, but preferably includes an insert downstream wall 266 as well as an downwardly traveling screw insert wall 270. Downstream wall 266 and downwardly traveling screw insert wall 270 are included in that they correspond with downstream wall 236 and downwardly traveling screw wall 244 of the feed barrel 214 respectively. The heat from walls 236 and 244 are thus isolated from the base resin 24 by the walls 266 and 270.

Since the insert 210 serves to isolate the heat from the extruder 22 and keep the base resin 24 cold, it is preferable that the insert 210 be ineffective in transferring heat from the housing 230 of the feed barrel 214.

There are several ways of curing the ineffective heat transfer desired between the insert 210 and the feed barrel 214. First, a water cooling may be practiced by running a fluid 275 through the walls of the insert 264. The passage of the fluid 275 is to be a number of conduits 306 drilled throughout both walls 264. The cooling fluid 275 may be utility water supply, however, circulating chilled water is preferred.

Furthermore, pads 272 may be placed on outer surface 274 of the walls 270 and 266 to assure the spacing between the walls 266 and 270 and the feed barrel 214. In fact, these pads may be made of an insulative material to improve the heat insulating properties even further.

The insert 210 may be made of any suitable durable material which is chemically non-reactive with the base resin 24. While the invention may be practiced with an insert 210 made of steel or other somewhat conductive material, preferably, the insert 210 is made of an somewhat thermally non-conductive material, such as an insulative material, for example, a ceramic or a carbon graphic material, or a suitable plastic material.

Figure 4:
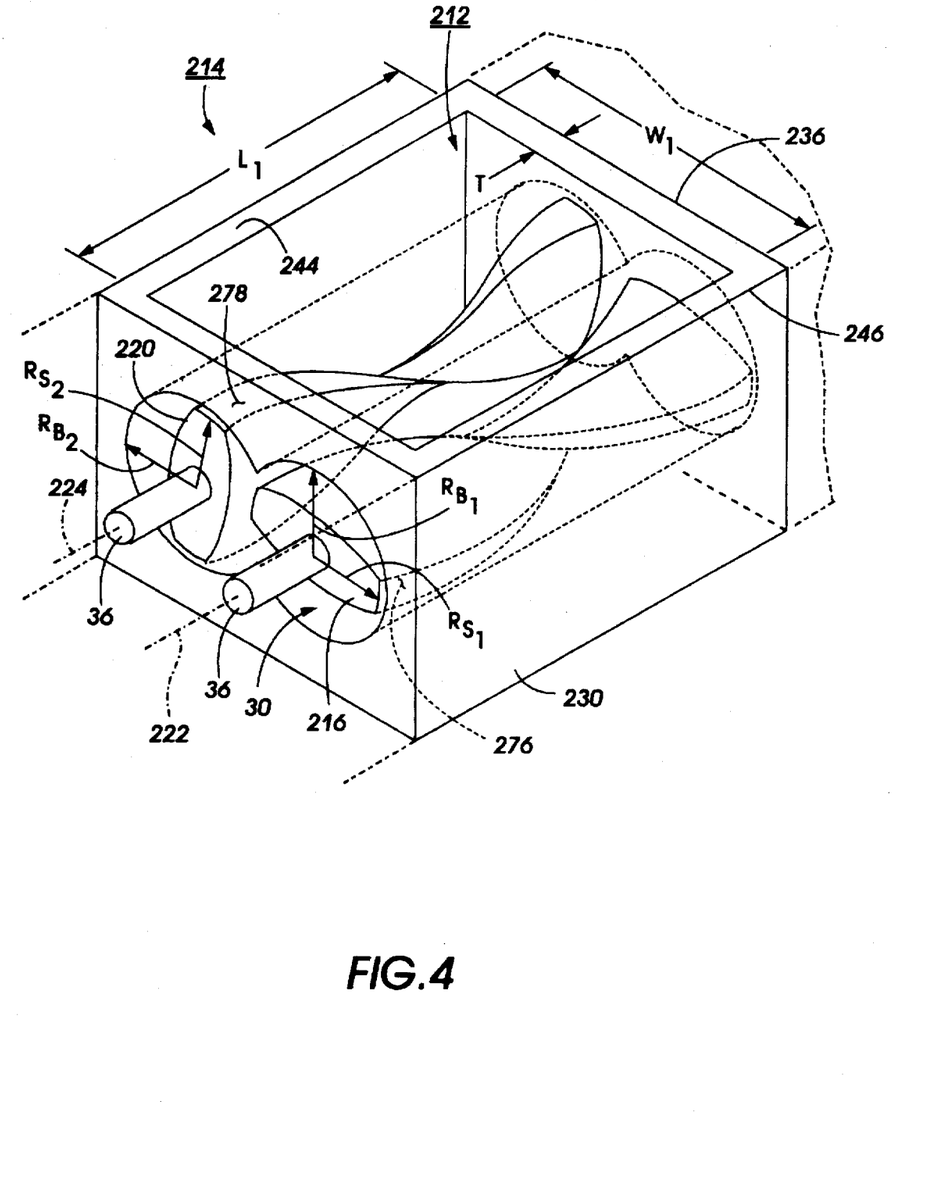
FIG. 4 is a perspective view of the toner extruder feed port of FIG. 1.

Referring now to FIG. 4, the feed barrel 214 is shown in greater detail. The first screw 216 as well as the second screw 220 rotate within aperture 30 along axis 222 and 224 respectively. First screw 216 has a periphery 276 defined by radius $R_{S1}$, while second screw 220 has a periphery 278 defined by radius $R_{S2}$. The aperture 30 is defined by radius $R_{B1}$ at the first screw 216 and by radius $R_{B2}$ at the second screw 220. Radius $R_{S1}$ and $R_{S2}$, are typically identical and are slightly smaller than radius $R_{B2}$ and $R_{B1}$.

The walls of the feed barrel 214 have any suitable width capable of withstanding the pressures, temperatures, and other environment factors of the extruder 22 but typically have a thickness T of approximately one inch. The walls of the feed barrel define the housing aperture 212 which has a length $L_1$ and a width $W_1$.

Figure 5:
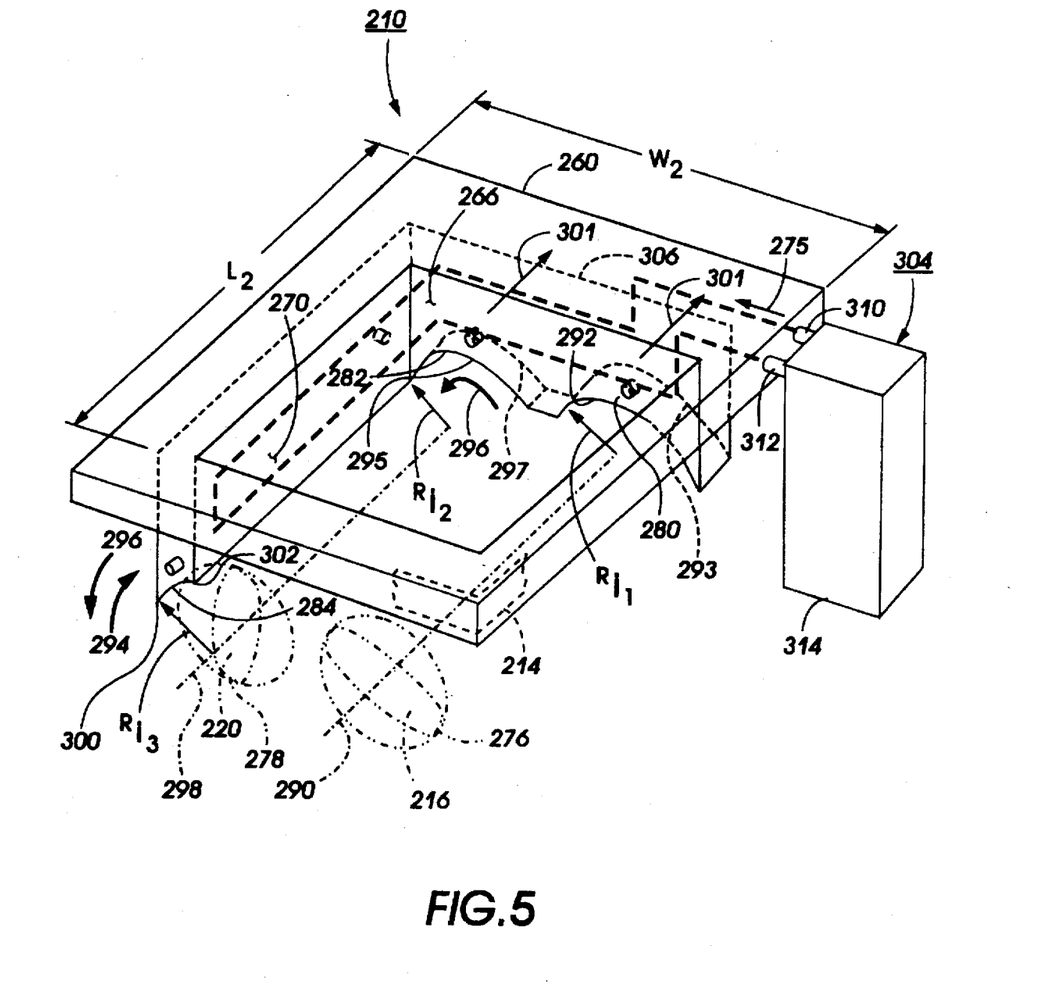
FIG. 5 is a perspective view of a toner extruder feed port insert of FIG. 1.

Referring now to FIG. 5, the insert 210 is shown in greater detail. The insert 210 includes the top rim 260 as well as downwardly traveling screw insert wall 270 and downstream insert wall 266 which extend vertically downward from the top rim 260. It should be appreciated that a third and fourth wall may be added to the insert and still remain within the scope of the invention. The applicant, however, has found that a third or fourth wall (not shown) are not required for the effective implementation of the invention.

Referring again to FIG. 5, insert 210 is shown. To accommodate the polyester base resin which has a lower melt temperature than standard resins, the gap between the barrel and the screws need to be increased. This is accomplished with the use of the insert 210. For the use of the low melt base resin 24, the distance between at upstream end of the first screw downstream wall bore 280 and the first screw 216 as well as the distance between the second screw downstream wall bore 282 and the second screw 220 is more than the corresponding distance at the downstream end of the bores. Furthermore, the distance between the entering end of the downwardly traveling screw insert wall 284 and the second screw 220 is more than that distance at the other end of the downwardly traveling screw insert wall 284 and the second screw 220.

Because of the intense heat of the extruding process, the extruder 22 (see FIG. 2) may generate sufficient heat that when the low melt base resin toner 24 contacts the screws 216 and 220 (see FIG. 4), the base resin 24 may melt even with the use of the insert 210. The applicant has found by providing surface 284 with clearances between the surface 284 and the screw 220, which clearance is increased in the direction opposite to the direction of rotation of the screws 36, the prematurely melted base resin 24 will be conveyed away by the screws 36 and not be scrapped along the periphery 278 of the screw 220. The applicant has also found that by providing surfaces 280 and 282 with clearances between the surfaces 280 and 282, and the screws 216 and 220, which clearances are decreased in the direction of flow of the extrudate 110, the prematurely melted base resin 24 will be conveyed away by the screws 36 and not be scrapped along the peripheries 276 and 278 of the screws 216 and 220, respectively.

Increasing the clearance of the insert 210 to the screws 36 may be accomplished in any suitable way. For example, again referring to FIG. 5, the first screw downstream wall bore 280 may be defined by radius $R_{i1}$. The radius $R_{i1}$ extends from axis 290 of the insert 210. Axis 290 is parallel and concentric with the axis 222 of the screw 216 when the insert 210 is assembled into the feed barrel 214. Radius $R_{i1}$ is slightly larger than radius $R_{S1}$ of the first screw 216 at first end 292 of bore 280. The radius $R_{i1}$ decreases steadily in the direction of material flow 301 such that the radius $R_{i1}$ at second end 293 of bore 280 is slightly smaller than the radius $R_{i1}$ at first end 292, typically 2 to 3 mm.

Second screw downstream wall bore 282 is defined by radius $R_{i2}$ which extends from axis 298 of insert 210. Axis 298 is parallel and concentric with second screw axis 224 of the second screw 220 when the insert 210 is assembled into the feed barrel 214. The radius $R_{i2}$ is slightly larger than radius $R_{S2}$ of the second screw 220 at the entering end 295 of the bore 282. Radius $R_{i2}$ decreases steadily in the direction of material flow 301. At second end 297 of the bore 282, the radius $R_{i2}$ is slightly smaller than the radius $R_{i2}$ at the entering end 295.

Downwardly traveling screw insert wall surface 284 is defined by radius $R_{i3}$ which extends from axis 298 of insert 210. The radius $R_{i3}$ increases steadily in size in the direction of arrow 294 which is opposite arrow 296 of the screws 36. Radius $R_{i3}$ at position 300 is slightly larger than radius $R_{S2}$ of the second screw 220 while radius $R_{i3}$ at position 302 is significantly larger than radius $R_{S2}$ of the second screw 22 and slightly larger than radius $R_{i3}$ at position 302.

On the FIG. 5, the cooling feature 304 includes a chamber 306 within the insert 210 is shown. The chamber 306 may be in the form of a conduit. The conduit 306 may be positioned anywhere within the insert, and may, for example, extend around the top rim 260 of the insert 210. An inlet 310 as well as an outlet 312 are operatively connected to the conduit 306. A cooling source 314 is connected to the inlet 310 as well as to the outlet 312. It should be appreciated that the cooling feature 304 may be accomplished by an external conduit (not shown) attached to the insert 210 as well as by an internal conduit within the insert 310.

It should be appreciated that the bores 280 and 282 may, like wall surface 284, have a profile that provides for a decrease in clearance between the screws 36 and the insert 210 in the direction of rotation 296 of the screws 36.

The fluid 275 is circulated through the conduit 306 of the cooling feature. The fluid 275 may be air or, preferably, water or ethylene glycol. The cooling source may be tap water or a tank of fluid. The fluid may be propelled through the conduit in any suitable fashion, for example, by a pump (not shown). The cooling feature 304 serves to remove the heat from the insert 210 making it more effective.

The feed port insert of the present invention isolates the extruder heat from the resin to reduce the melting of resin at the feed port. This reduction of heat of the resin prevents melting of the resin at the feed port insert and the associated problems with melted toner at the feed port.

The use of a toner extruder feed port insert made from a non-conductive material provides for a more effective insert which reduces the melting of the toner at the feed port.

The use of an insert with walls between the base resin and the extruder reduces the heat transferred to the base resin and reduces thereby the melting of the base resin and its associated problems.

The use of an insert with screw contact surfaces which have reduced clearance in the direction of rotation of the screws provides for improved disposal of melted resin on the surfaces of screws at the feed port.

While the invention has been described with reference to the structures and embodiments disclosed herein, it is not confined to the details set forth, and encompasses such modifications or changes as may come within the purpose of the invention.

I claim:

1. A toner extruder for the preparation of a toner resin extrudate from a resin comprising:
   a housing defining a housing aperture and a resin inlet opening therein;
   means for conveying the resin through the housing aperture; and
   an insert disposed at least partially within the resin inlet opening for inhibiting the heat transfer from said housing to the resin at the opening, whereby the flow of resin adjacent the opening is improved.

2. The toner extruder of claim 1, wherein said conveying means comprises an auger.

3. The toner extruder of claim 1, wherein said a substantial portion of said insert is spaced from said housing.

4. The toner extruder of claim 3, further comprising a plurality of spacers positioned between said insert and housing for spacing said insert from said housing.

5. The toner extruder of claim 1, wherein said insert is slidably removable from said housing.

6. The toner extruder of claim 1, wherein said insert defines a chamber therein.

7. The toner extruder of claim 6, wherein said insert further comprises:
   an inlet; and
   an outlet, said inlet and said outlet operably connected to the chamber.

8. The toner extruder of claim 7, wherein said inlet, said insert and said outlet permit the flow of a fluid from said inlet, through said chamber and to said outlet.

9. The toner extruder of claim 3, wherein a portion of said insert closely conforms to said conveying means.

10. The toner extruder of claim 9, wherein said portion of said insert which closely conforms to said conveying means more closely conforms to said conveying means in the direction of rotation of said conveying means.

11. The toner extruder of claim 9, wherein said portion of said insert which closely conforms to said conveying means more closely conforms to said conveying means in the direction of flow of the toner resin.

12. The toner extruder of claim 10, wherein said portion of said insert which closely conforms to said conveying means is located downstream of said inlet in the direction of the flow of the resin.

13. The toner extruder of claim 9, wherein said portion of said insert which closely conforms to said conveying means is elongated in the direction of the flow of the resin.

14. The toner extruder of claim 13, wherein said portion of said insert which closely conforms to said conveying means more closely conforms to said conveying means in the direction of rotation of said conveying means.

15. A method for preparing a toner resin from a base resin, comprising:
   conveying the base resin to an aperture in the housing of a toner extruder, the housing surrounding a conveyor;
   positioning an insert at least partially within the aperture so as to inhibiting the heat transfer from the extruder to the base resin at the aperture
   adding chemical initiator to a toner extruder;
   mixing the base resin and the chemical initiator within the extruder to form the mixed resin; and conveying the mixed resin within the extruder to an extruding die.

16. A method of claim 15, wherein the positioning step further comprises spacing the housing from the resin at the aperture.

17. A method of claim 15, wherein the positioning step further comprises spacing a substantial portion of the periphery of the insert from the housing.

18. A method of claim 17, further comprising the step of cooling the insert.

19. A method of claim 15, further comprising the step of premixing the base resin with the chemical initiator.

20. A method of claim 15, further comprising the step of cooling the base resin.

* * * * *